(12) United States Patent
Oehl et al.

(10) Patent No.: US 7,266,872 B2
(45) Date of Patent: Sep. 11, 2007

(54) METHOD AND DEVICE FOR THE SEPARATION OF TUBES

(75) Inventors: Rainer Oehl, Grossurgwedel (DE); Klaus Binder, Sarstedt (DE); Markus Berger, Sehnde (DE)

(73) Assignee: Contitech Luftfedersysteme GmbH, Hannover (DE)

( * ) Notice: Subject to any disclaimer, the term of this patent is extended or adjusted under 35 U.S.C. 154(b) by 545 days.

(21) Appl. No.: 10/501,156

(22) PCT Filed: May 17, 2003

(86) PCT No.: PCT/DE03/01594

§ 371 (c)(1),
(2), (4) Date: Jul. 13, 2004

(87) PCT Pub. No.: WO2004/002693

PCT Pub. Date: Jan. 8, 2004

(65) Prior Publication Data

US 2005/0082203 A1 Apr. 21, 2005

(30) Foreign Application Priority Data

Jun. 28, 2002 (DE) ................. 102 29 081

(51) Int. Cl.
*B23D 3/16* (2006.01)
(52) U.S. Cl. .................. 29/33 T; 29/560.1; 425/289; 264/40.1; 264/138

(58) Field of Classification Search ............ 29/33 T, 29/560.1; 425/113, 289, 292, 295, 296, 393, 425/403; 264/40.1, 138, 145, 157, 159; 242/533.7
See application file for complete search history.

(56) References Cited

U.S. PATENT DOCUMENTS 3,128,216 A 4/1964 Reed (Continued)

FOREIGN PATENT DOCUMENTS

DE 1 180 518 6/1965

(Continued)

*Primary Examiner*—Dana Ross

(57) ABSTRACT

An apparatus and method for separation of tubes produced continuously on a row of mandrels, continuously coupled to one another, by the mandrels being advanced in a conveying direction (X) and by material layers being applied to the mandrels. A material difference exists from the mandrel material at a connection point of successive mandrels. A measuring device detects the connection point of the successive mandrels, and a separating device, arranged downstream of the measuring device in the conveying direction (X), provides for the separation of the tubes. The separating device is controlled by the measuring device in order to align the separating device with the connection point. The separating device has a cutting head rotatable about the connection point, and advances in the conveying direction (X) synchronously with the mandrels during the separating operation.

22 Claims, 4 Drawing Sheets

U.S. PATENT DOCUMENTS

| | | | | |
|---|---|---|---|---|
| 3,270,117 A | * | 8/1966 | Hobson | 264/320 |
| 4,013,494 A | * | 3/1977 | Patterson | 156/86 |
| 4,118,162 A | * | 10/1978 | Baumgarten | 425/113 |
| 4,125,423 A | | 11/1978 | Goldsworthy | |
| 4,753,699 A | * | 6/1988 | Deregibus | 156/195 |
| 5,566,929 A | * | 10/1996 | Thurow | 267/64.24 |
| 5,584,203 A | * | 12/1996 | Eversberg et al. | 72/209 |
| 6,047,915 A | * | 4/2000 | Jaschke | 242/473.9 |
| 6,692,673 B2 | * | 2/2004 | Nakamura | 264/159 |
| 2005/0199335 A1 | * | 9/2005 | Oehl et al. | 156/173 |

FOREIGN PATENT DOCUMENTS

| | | |
|---|---|---|
| DE | 25 45 058 A1 | 4/1977 |
| DE | 29 06 177 A1 | 8/1980 |
| DE | 27 50 642 C2 | 6/1989 |
| DE | 38 40 788 A1 | 6/1989 |
| DE | 42 33 023 A1 | 4/1994 |
| DE | 43 04 246 A1 | 8/1994 |
| DE | 44 23 602 A1 | 1/1996 |
| DE | 198 12 524 C2 | 7/2001 |
| EP | 1 122 052 A2 | 8/2001 |

* cited by examiner

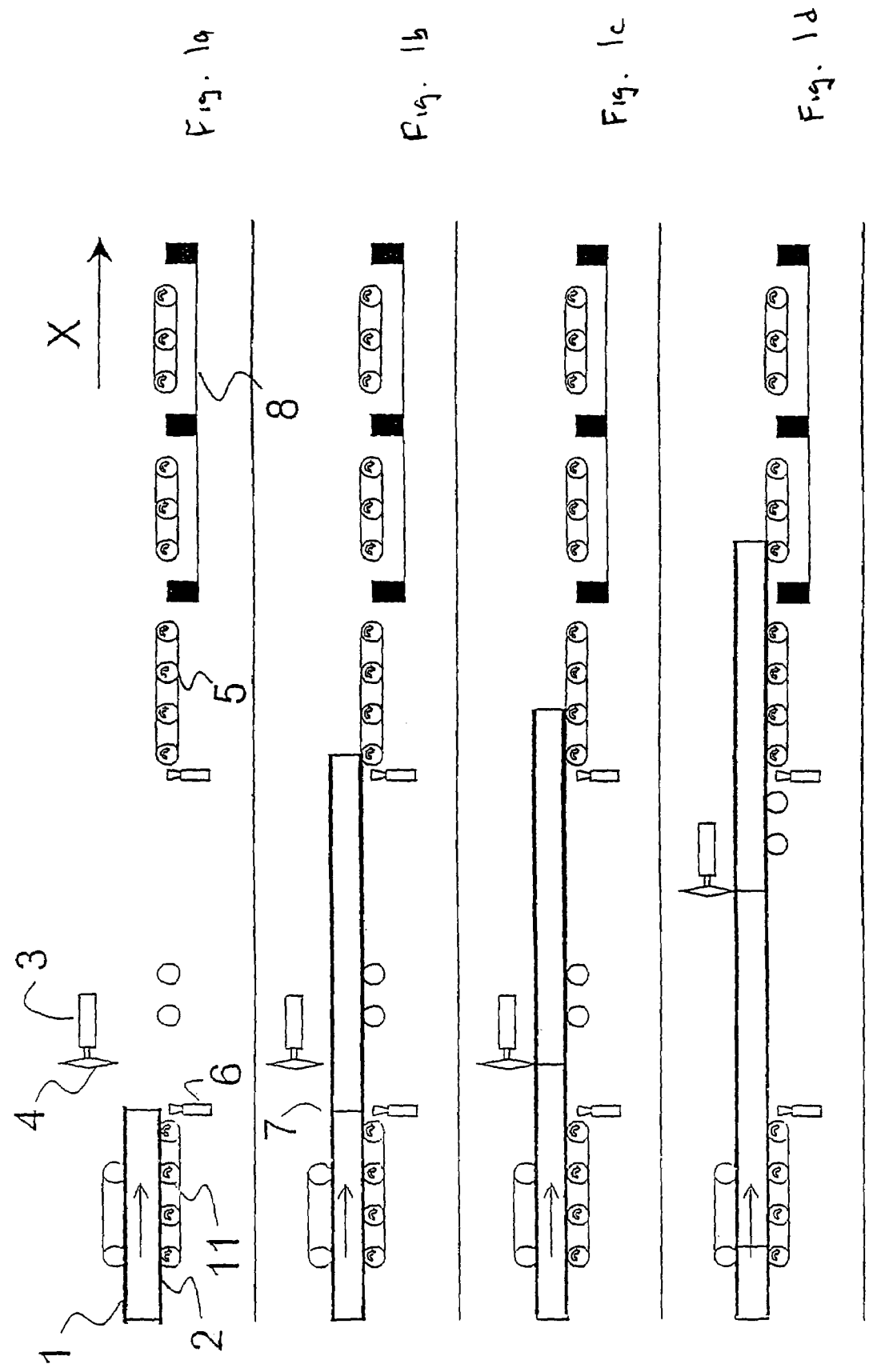

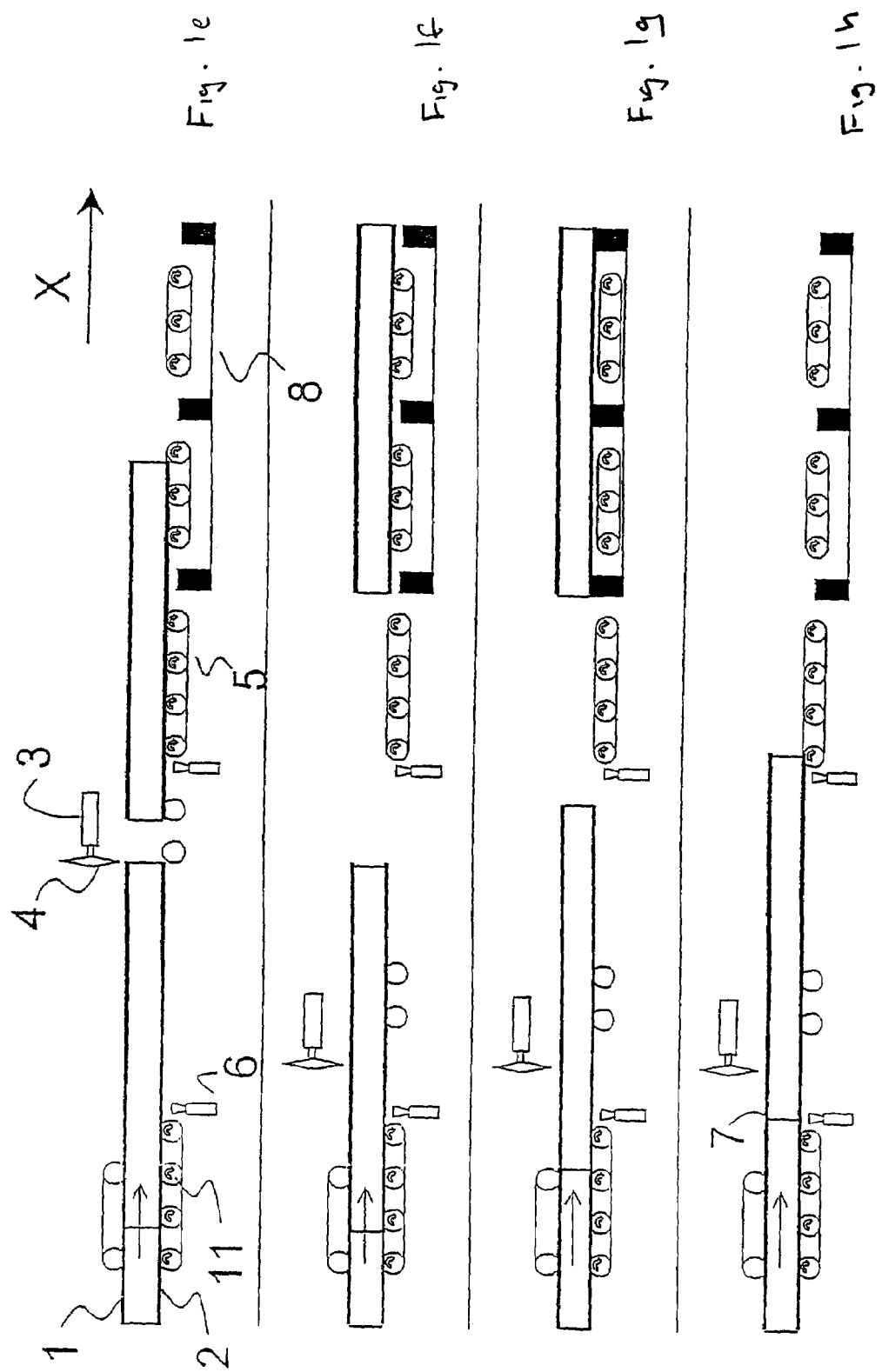

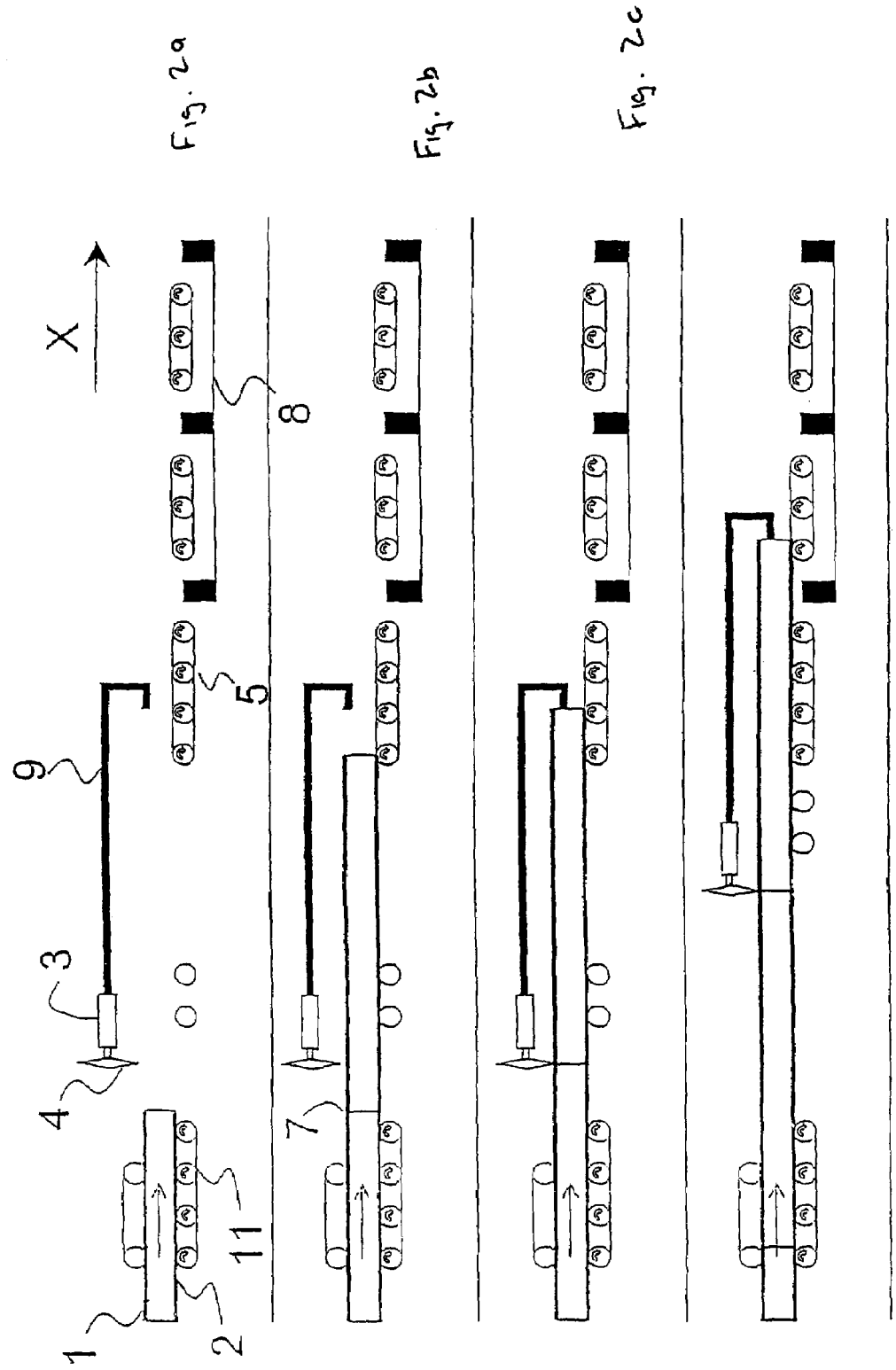

METHOD AND DEVICE FOR THE SEPARATION OF TUBES

BACKGROUND OF THE INVENTION

1. Field of the Invention

The invention relates to a method and an apparatus for the separation of tubes which are produced continuously on a row of cylindrical mandrels, continuously coupled to one another, by the mandrels being advanced in a conveying direction.

2. Background Description

An automated method of producing multilayer tubes has been disclosed by DE 27 50 642 C2, in which rubber and reinforcement layers are wound onto a rotating mandrel mounted in a fixed position. In this case, a material feed unit is moved in the longitudinal direction along the mandrel. A disadvantage of this method is that this production method does not work continuously, but is limited to the length of the mandrel. In addition, the thickness and the angle of the wound-on rubber and reinforcement layers can not be applied with sufficient accuracy.

DE 44 23 602 A1 discloses a similar winding method in which the tube is not cut until after its vulcanization in order to reduce entrapped air between the rubber and reinforcement layers. In addition, the fabric ends are fused after being cut open, so that an adverse penetration of air between the rubber and reinforcement layers is prevented.

A winding method for the continuous production of tubes is described in DE 1 180 513, in which rubber and reinforcement layers are wound onto a row of mandrels lined up endlessly one behind the other and advanced in a conveying direction. The tube is vulcanized onto the mandrels. The mandrel sections are then drawn off and releasably attached to the end of the mandrel section running into the winding machine. In a disadvantageous manner, the precision required for air spring bellows cannot be ensured during the winding method. In addition, the mandrels are thermally loaded during the vulcanization and there is the risk of the mandrels being deformed, so that a uniform quality of the tubes can no longer be ensured.

An apparatus for producing curved rubber tubes is described in DE 25 45 058 C3, in which apparatus, by means of at least one extruder and a yarn reinforcing machine, rubber and reinforcement layers are applied to mandrels advanced continuously in the conveying direction. In this case, the mandrels abut against one another directly in a seamless manner. In a cutting device, two mandrels are in each case mutually displaced in such a way that a gap in which a cutting blade of the cutting device can engage is produced between their end faces. In a disadvantageous manner, the yarn braiding in this case is stretched in the tube and changed in its position. The mandrels are flexible and are brought together with the tube piece located on a mandrel into a curved position and are vulcanised in a vulcanisation unit. The vulcanised tube is then separated from the mandrel.

SUMMARY OF THE INVENTION

The invention relates to a method and an apparatus for the separation of tubes which are produced continuously on a row of cylindrical mandrels, continuously coupled to one another, by the mandrels being advanced in a conveying direction and by rubber and reinforcement layers being applied to the mandrels, there being a material difference from the mandrel material at the connection points of successive mandrels.

The invention provides an improved automated method and an apparatus for the separation of tubes which ensure sufficient precision of the tubes for air springs and ensure high process reliability. Such tubes are used, for example, for air spring bellows in vehicles. Such a tube is in this case formed from superimposed tubular rubber and reinforcement layers.

The invention is achieved with the apparatus of the generic type by a measuring device for detecting the connection points of successive mandrels and a separating device, arranged downstream of the measuring device in the conveying direction, for cutting off the tubes. The separating device may be controlled by the measuring device in order to align the separating device with the connection point. The separating device has a cutting head rotatable about the connection point, and is capable of being advanced in the conveying direction synchronously with the mandrels during the separating operation.

Due to the automatic detection of the connection points and cutting of the tubes at the connection points during the mandrel advance, it is possible to cut off the tubes during continuous operation. In this case, it is not necessary to artificially produce a gap by pulling the mandrels apart before the cutting, and displacement of the yarn layers by the cutting operation is avoided.

After the separation of the tubes, the connection of the mandrels at the connection point is released by means of a device which is coupled to the separating device. The released mandrels may then be advanced and singularized in a conveying device which is arranged downstream of the separating device as viewed in the conveying direction. To this end, the speed of the conveying device is set to be higher than the mandrel feed speed. Thus, the singularized mandrels can then be removed by a manipulating mechanism and the cut-off tubes can be removed from the mandrels without influencing the continuous production process.

Encircling grooves may be provided at the connection points of the mandrels. These grooves may be detected by the measuring device. It is then possible for a cutting blade to plunge into these grooves during the separating operation, so that the mandrels and the connection points of the mandrels and also the blade are not damaged. Alternatively, however, the groove may also be closed with a component into which the blade plunges and which serves as a wearing part.

The measuring device may have an inductive sensor. The connection point can thus be detected easily and reliably with reference to material differences. Alternatively, for this purpose, the measuring device may also be designed as a mechanical driver which travels along with the mandrels and is mechanically coupled to the separating device. The measuring device may also have a measuring wheel which is coupled to the mandrels and determines the feed of the mandrels. A cut is then made in each case at fixed intervals in accordance with the mandrel length.

Corresponding to the invention, the method of the generic type has, according to the invention, the steps of detection of the connection points of successive mandrels and positioning of a cutting head of a separating device for cutting the tube to length in such a way that the cutting head is aligned with the detected connection point. The method also includes, for example, advancing of the separating device in the conveying direction synchronously with the advancing speed of the mandrels and rotation of the cutting head about the circumference of the mandrel connection point for the circumferential cutting of the tube while the separating device is advanced. The separating device is withdrawn to an initial position after completion of the cutting operation.

BRIEF DESCRIPTION OF THE DRAWINGS

The invention is explained in more detail below with reference to the attached drawings, in which:

FIGS. 1a to 1h show an apparatus and sequence of the method according to the invention for the separation of tubes, as a schematic block diagram;

FIGS. 2a to 2d show an apparatus and sequence of the method according to the invention with a mechanical driver for positioning the separating device.

DETAILED DESCRIPTION OF EMBODIMENTS OF THE INVENTION

Figures 3A, 3B, 3C, 3D:
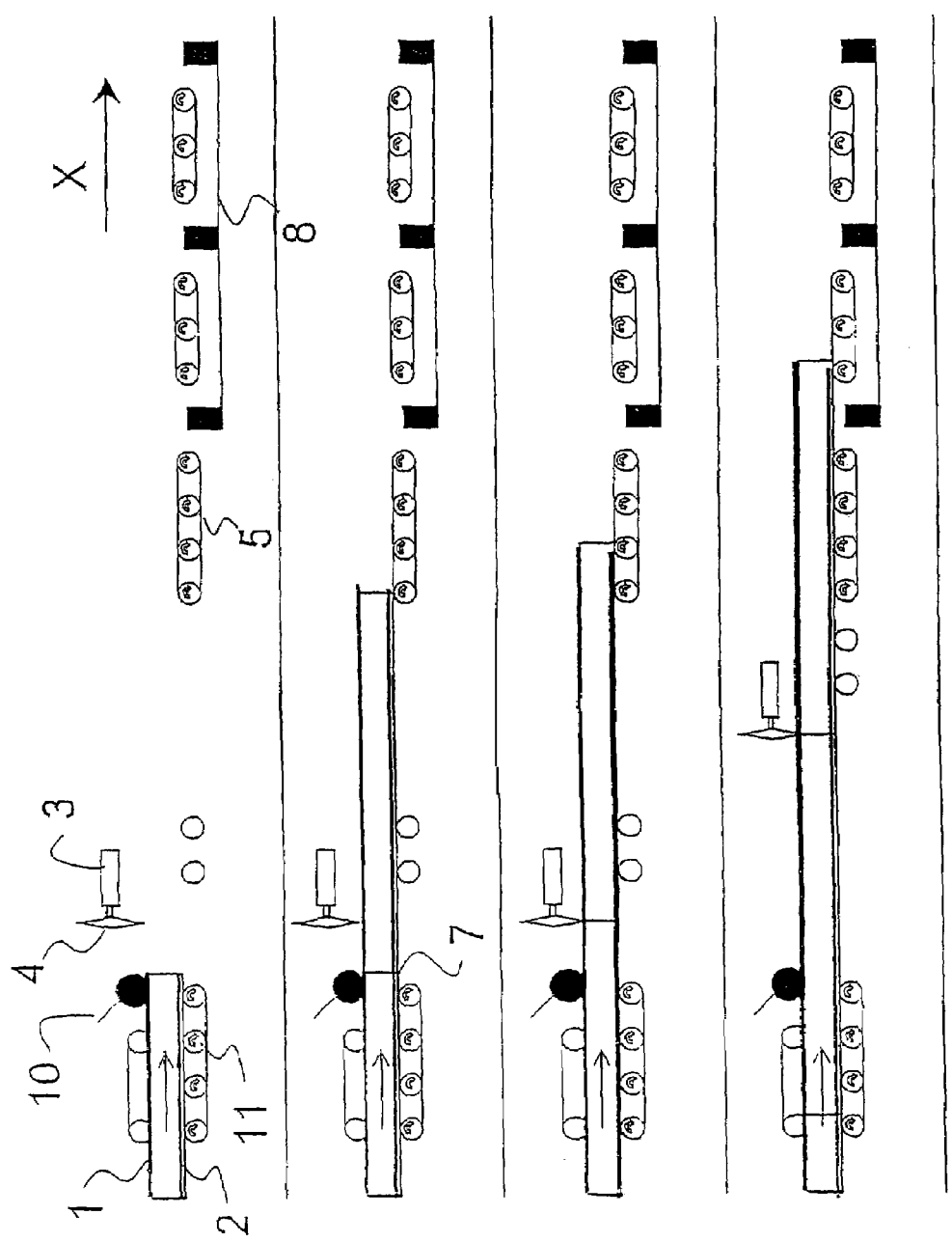
FIGS. 3a to 3d show an apparatus and sequence of the method according to the invention with a feed measuring unit for the displacement/linear measurement and positioning of the separating device.

FIG. 1 shows an apparatus for the separation of tubes 1, which are produced continuously on a row of cylindrical mandrels 2, continuously coupled to one another, by extrusion of rubber layers and spiral winding of yarn layers. To this end, the mandrels 2 are advanced in a conveying direction X, for example, by means of a conveying device 11.

The apparatus has a separating device 3 with a fixed or movable cutting head 4. The cutting head 4 of the separating device 3 is designed to be rotatable about the tube 1, so that the tubes 1 are cut off with a circumferential cut. The cutting head may be ultrasound cutting, laser cutting or water-jet cutting, for example. The separating device 3 is movable in the conveying direction X with a feeder mechanism in order to be able to carry out a circumferential cut during the advancement of the mandrels 2.

A further conveying device 5 is provided downstream of the separating device 3 in the conveying direction X in order to advance and singularize the released mandrels 2 having the cut-off tubes 1. This conveying device 5 may be any conventional belt driven device, for example.

According to the invention, a non-contact measuring device 6 is arranged upstream of the separating device 3 as viewed in the conveying direction X in order to detect the connection points 7 of successive mandrels 2.

FIG. 1a shows a first instant of the sequence of the method for the separation of tubes 1, at which a mandrel 2 initially runs over the measuring device 6. In the process, the measuring device 6 detects the constant mandrel material, but not a change of mandrel materials, as is characteristic of the connection points 7 of successive mandrels 2.

In FIG. 1b, the mandrel 2 is advanced further and the connection point 7 of two successive mandrels 2 is now located in the region of the measuring device 6. The latter, for example by inductive measuring, now detects the characteristic material change at the connection point 7 and transmits a starting signal to the separating device 3. Since the distance between the measuring device 6 and the separating device 3 and also the mandrel speed are known, the separating device 3, at the instant shown in FIG. 1c, positions the cutting head 4 directly at the connection point 7 of the successive mandrels 2 and carries out a circumferential continuous cut. To this end, the separating device 3, by means of the feeder mechanism, travels synchronously with the advanced mandrels 2 at mandrel speed, as can be seen in the sequence of FIG. 1d.

As viewed in conveying direction X, a further sensor 6' may be optionally arranged downstream of the separating device 3 in order to activate the sensor 6.

As shown in FIG. 1e of the sequence, the circumferential cut around the tube 1 is complete, and the mandrel 2 with the cut-to-length tube 1 is released from the following row of continuous mandrels 2 by releasing a coupling. The released mandrel 2 is advanced by means of the conveying device 5 at a higher speed than the advancing speed of the mandrels 2, and is singularized in this way. In this case, the mandrel 2 is conveyed up to a manipulating device 8 in order to take the mandrel 2 out of the continuous process and to draw off the cut-to-length tube 1 from the singularized mandrel 2 without impairing the continuous production process. As can be seen from the method sequences shown in FIGS. 1f and 1g, the separating device 3, after completion of the circumferential cut, travels forward again in the opposite direction to the conveying direction X and are ready for a further cut. The sequence of FIG. 1h corresponds to the instant FIG. 1b in the preceding method stage, and the method of separating tubes 1 is repeated continuously with this sequence.

FIGS. 2a to 2d show an alternative embodiment of the apparatus and sequence for the separation of the tubes 1, in which the separating device 3 is mechanically connected to a driver 9. The driver 9 extends in such a way that, as can be seen in the sequence of FIGS. 2c and 2d, when a mandrel end strikes the driver 9, the separating device 3 is moved in the conveying direction X together with the mandrels 2. The circumferential cut for the separation of the tube 1 is then made.

The driver 9 is oriented in such a way that the cutting head 4 of the separating device 3 is positioned precisely at the cutting region of the connection points 7 of successive mandrels 2. After completion of the circumferential cut, the driver 9 with the separating device 3 is uncoupled from the mandrels 2 and withdrawn again into the initial position.

FIGS. 3a to 3d show another embodiment of the apparatus and sequence for the separation of the tubes 1. In this embodiment, a feed measuring device 10, for example a measuring wheel, is provided for detecting the connection point(s) 7 of two successive mandrels 2 and for controlling the separating device 3. With the feed measuring device 10, the feed of the tubes 1 in the conveying direction X is continuously measured, and the position of the cutting regions at the connection points 7 of successive mandrels 2 is calculated from the known length of the individual mandrels 2.

As can be seen from the sequence of FIG. 3c, the cutting head 4 of the separating device 3 is set down precisely on the cutting region at a connection point 7 and the tube 1 is cut off, for example, with a circumferential cut. During the separating operation, the separating device 3 travels synchronously with the mandrels 2 and the tubes 1 applied thereto as shown in FIG. 3d.

While the invention has been described in terms of preferred embodiments, those skilled in the art will recognize that the invention can be practiced with modification within the spirit and scope of the appended claims.

It is claimed:

1. An apparatus for separation of tubes produced continuously on a row of mandrels, continuously coupled to one another, by the mandrels being advanced in a conveying direction (X) and by material layers being applied to the mandrels, there being a material difference from the mandrel material at a connection point of successive mandrels, comprising: a measuring device for detecting the connection point of the successive mandrels, a separating device, arranged downstream of the measuring device in the conveying direction (X), for The separation of the tubes, the separating device being controlled by the measuring device in order to align the separating device with the connection point, wherein the separating device has a cutting head rotatable about the connection point, and advances in the conveying direction (X) synchronously with the mandrels during the separating operation.

2. The apparatus as claimed in claim 1, further comprising a device which is coupled to the separating device for releasing the connection between the mandrels at the connection point after the separation of the tubes.

3. The apparatus as claimed in claim 2, further comprising a conveying device arranged downstream of the separating device in the conveying direction which advances and singularizes the released mandrels.

4. The apparatus as claimed in claim 3, wherein the measuring device detects material differences between the mandrels at the connection point of successive mandrels.

5. The apparatus as claimed in claim 3, wherein the measuring device has a measuring wheel, coupled to the mandrels, for detecting the feed of the mandrels.

6. The apparatus as claimed in claim 5, wherein the cutting head has a fixed or movable cutting edge.

7. The apparatus as claimed in claim 6, wherein the cutting head is ultrasound cutting, laser cutting or water-jet cutting.

8. The apparatus as claimed in claim 1, wherein the measuring device detects material differences between the mandrels at the connection point of the successive mandrels.

9. The apparatus as claimed in claim 8, wherein the measuring device has an inductive sensor.

10. The apparatus as claimed in claim 1, wherein the measuring device has a measuring wheel, coupled to the mandrels, for detecting the feed of the mandrels.

11. The apparatus as claimed in claim 1, wherein the cutting head has a fixed or movable cutting edge.

12. The apparatus as claimed in claim 11, wherein the cutting head is ultrasound cutting, laser cutting or water-jet cutting.

13. A method of separating tubes which are produced continuously on a row of mandrels, continuously coupled to one another, by the mandrels being advanced in a conveying direction (X) and by material layers being applied to the mandrels, there being a material difference from the mandrel material at a connection point of successive mandrels, the steps comprising: detecting the connection point of the successive mandrels, positioning a cutting head of a separating device for cutting the tube to length wherein the cutting head is aligned with the detected connection point, advancing of the separating device in the conveying direction (X) synchronously with the advancing speed of the mandrels, rotating of the cutting head about the circumference of the connection point for the circumferential cutting of the tube while the separating device is advanced, and withdrawing of the separating device to an initial position after completion of the cutting operation.

14. The method as claimed in claim 13, further comprising: releasing of a connection between the mandrel which carries the cut-off tube and the following mandrel in the conveying direction (X), and advancing the released mandrel at a higher advancing speed than a speed of the advancing mandrel to singularize the released mandrel.

15. The method as claimed in claim 14, wherein the detecting of the connection point includes measuring material differences at the connection point of the successive mandrels.

16. The method as claimed in claim 15, wherein the measuring of the material differences is provided inductively or mechanically.

17. The method as claimed in claim 13, further comprising inductive measurement of the material differences at the connection point of the successive mandrels for detecting connection points.

18. The method as claimed in either of claims 13, wherein the detecting of the connection point is provided by a measuring wheel which is coupled to the mandrels.

19. The method as claimed in claim 13, wherein the tubes are cut off with a fixed or a moved cutting edge.

20. The method as claimed in claim 13, wherein the tubes are cut off by ultrasound cutting, laser cutting or water-jet cutting.

21. The method as claimed in claim 20, wherein the cutting head plunges into a circumferential cutting region at the connection point of the successive mandrels.

22. A method of separating tubes comprising the steps of: continuously supplying material on successive mandrels continuously coupled to one another to form the tubes; detecting a connection point of the successive mandrels, aligning a cutting head for cutting with the detected connection point, advancing the cutting head in a conveying direction (X) synchronously with advancement of the mandrels, and cutting at the connection point white the cutting head and the successive mandrels are advancing.

* * * * *